US012789606B2

(12) United States Patent
Choi et al.

(10) Patent No.: US 12,789,606 B2
(45) Date of Patent: Nov. 10, 2026

(54) JOINT STRUCTURE OF VEHICLE BODY

(71) Applicants: Hyundai Motor Company, Seoul (KR); Kia Corporation, Seoul (KR); DRB Automotive Co., Ltd., Busan (KR)

(72) Inventors: Hyungsik Choi, Hwaseong-si (KR); Won Ki Song, Hwaseong-si (KR); Jaeseung Lee, Hwaseong-si (KR); Jin Ho Hwang, Hwaseong-si (KR); Soo Bok Kim, Hwaseong-si (KR); Dae Hee Lee, Hwaseong-si (KR); Young Hak Kim, Yangsan-si (KR); Su Won Yang, Yangsan-si (KR)

(73) Assignees: Hyundai Motor Company, Seoul (KR); Kia Corporation, Seoul (KR); DRB Automotive Co., Ltd., Busan (KR)

( * ) Notice: Subject to any disclaimer, the term of this patent is extended or adjusted under 35 U.S.C. 154(b) by 192 days.

(21) Appl. No.: 18/915,972

(22) Filed: Oct. 15, 2024

(65) Prior Publication Data

US 2025/0196600 A1 Jun. 19, 2025

(30) Foreign Application Priority Data

Dec. 13, 2023 (KR) ........................ 10-2023-0180575

(51) Int. Cl.
*B60J 10/00* (2016.01)
*B60J 10/21* (2016.01)

(52) U.S. Cl.
CPC ............... *B60J 10/45* (2016.02); *B60J 10/21* (2016.02)

(58) Field of Classification Search
CPC ... B60J 10/45; B60J 10/21; B60J 10/84; B60J 10/85; B60J 10/25; B60J 10/27; B60J 10/40; B60J 10/86; B60J 10/87; B60J 10/32; B60J 10/33; B62D 27/023; B62D 27/06; B62D 63/025; B60R 13/06; B60R 13/07
USPC ... 296/193.04, 193.03, FOR. 118, FOR. 117; 49/476.1, 490.1
See application file for complete search history.

(56) References Cited

U.S. PATENT DOCUMENTS

| | | | | |
|---|---|---|---|---|
| 5,301,997 | A * | 4/1994 | Cudden | B62D 47/00 296/193.04 |
| 2025/0091653 | A1* | 3/2025 | Song | B62D 63/025 |
| 2025/0187676 | A1* | 6/2025 | Choi | B62D 23/005 |
| 2026/0138681 | A1* | 5/2026 | Bechtel | B62D 27/06 |

* cited by examiner

*Primary Examiner* — Wenwei Zhuo
(74) *Attorney, Agent, or Firm* — Slater Matsil, LLP

(57) ABSTRACT

An embodiment joint structure of a vehicle body includes a fixed part sealing flange disposed on an edge of a rear opening portion of a front body module of the vehicle body, wherein the front body module is a fixed part fixed to an under body of the vehicle body, a fixed part weather strip mounted on the fixed part sealing flange, a variable part sealing flange disposed on an edge of a front opening portion of a rear body module, wherein the rear body module is a variable part detachably coupled to the front body module along a front-to-back direction of the vehicle body by a joint, and a variable part weather strip mounted on the variable part sealing flange in close contact with the fixed part weather strip.

20 Claims, 8 Drawing Sheets

100

JOINT STRUCTURE OF VEHICLE BODY

CROSS-REFERENCE TO RELATED APPLICATIONS

This application claims the benefit of Korean Patent Application No. 10-2023-0180575, filed on Dec. 13, 2023, which application is hereby incorporated herein by reference.

TECHNICAL FIELD

The present invention relates to a vehicle body.

BACKGROUND

Recently, the vehicle industry is introducing a new concept of future mobility vision for realizing a human-centered, dynamic future city. One of these future mobility solutions is a purpose built vehicle (PBV) as a purpose-based mobility.

A PBV can be an example of an electric vehicle (EV)-based environment-friendly mobile vehicle. The PBV can provide various customized services to users while moving from the starting point to the destination in an unmanned autonomous driving method.

The vehicle body of such a PBV includes an under body (also referred to as a rolling chassis or a skateboard in the art) and an upper body assembled to the under body.

Here, the upper body may be configured in various forms according to the type of customized service of the PBV. For example, the PBV can be used as a hailing type vehicle having cabins respectively configured in the front and rear parts of the upper body. Furthermore, the PBV may be used as a cab type vehicle in which a cabin is configured only in the front portion of the upper body. Furthermore, the PBV may be used as a delivery type vehicle in which a cabin is configured in the front part of the upper body and a luggage room is configured in the rear part.

The PBV can only be used as a hailing or delivery vehicle, but if users can change its purpose, the vehicle's usage time can increase significantly.

In other words, if the vehicle's purpose can be easily changed, the front cabin of the vehicle, including the driver's seat of the upper body, and the under body are made of a common configuration, and if the rear of the upper body is configured to be easily replaceable, the vehicle usability can be increased while reducing costs.

Matters described in this background section are prepared to enhance understanding of the background of embodiments of the invention and may include matters other than the already known prior art.

SUMMARY

The present invention relates to a vehicle body. Particular embodiments relate to a joint structure that can be applied to the production of various body types.

Embodiments of the present disclosure provide a joint structure of a vehicle body that can be easily changed into various types of vehicle bodies to increase the usability of the PBV.

A joint structure of a vehicle body including a front body module as a fixed part fixed to an under body and a rear body module as a variable part detachable along the front-to-back direction of the vehicle body by a joint unit is provided. The joint structure according to an embodiment may include a fixed part sealing flange formed on an edge of a rear opening portion of the front body module, a fixed part weather strip mounted on the fixed part sealing flange, a variable part sealing flange formed on an edge of a front opening portion of the rear body module, and a variable part weather strip mounted on the variable part sealing flange so as to be in close contact with the fixed part weather strip.

The joint structure may further include a water tray unit formed by the fixed part sealing flange and the fixed part weather strip.

The water tray unit may communicate with a drain passage formed between the front body module and the rear body module.

The water tray unit may include a water tray channel of a 'U' shape formed in the fixed part sealing flange and a water tray lip of a 'U' shape formed in the fixed part weather strip.

The fixed part weather strip may include a sealing part connected to the fixed part sealing flange and a support lip extending from the sealing part to support a channel wall of the water tray channel.

The water tray lip may include a first lip extending from one side of the sealing part and in close contact with the rear body module and a second lip extending from the other side of the sealing part and in close contact with the variable part weather strip.

The variable part sealing flange may include a first fixing flange that fixes one side of the variable part weather strip and a second fixing flange that fixes the other side of the variable part weather strip.

The fixed part sealing flange may be formed to a fixed part side cover of a fixed part side structure, a fixed part roof cover of a fixed part roof structure, and a fixed part floor cover of a fixed part floor structure at the edge of the rear opening portion of the front body module.

The fixed part sealing flange may be formed in the cross-section shape of a 'U'.

The variable part sealing flange may be formed to a variable part side member and a variable part side cover of a variable part side structure, a variable part roof member and a variable part roof cover of a variable part roof structure, and a variable part floor member and a variable part floor cover of a variable part floor structure at the edge of the front opening portion of the rear body module.

A drain passage may be formed between the fixed part roof cover and the variable part roof cover and between the fixed part side cover and the variable part side cover.

According to the joint structure of a vehicle body according to embodiments of the present invention, the PBV can be easily changed into various types of vehicle bodies to increase the usability of the PBV and reduce the manufacturing cost of the PBV.

In addition, effects that can be obtained or expected due to embodiments of the present invention will be disclosed directly or implicitly in the detailed description of the embodiments of the present invention. That is, various effects expected according to embodiments of the present invention will be disclosed in the detailed description to be described later.

BRIEF DESCRIPTION OF THE DRAWINGS

Since these drawings are for reference in explaining exemplary embodiments of the present invention, the technical ideas of embodiments of the present invention should not be construed as being limited to the accompanying drawings.

Figure 1:
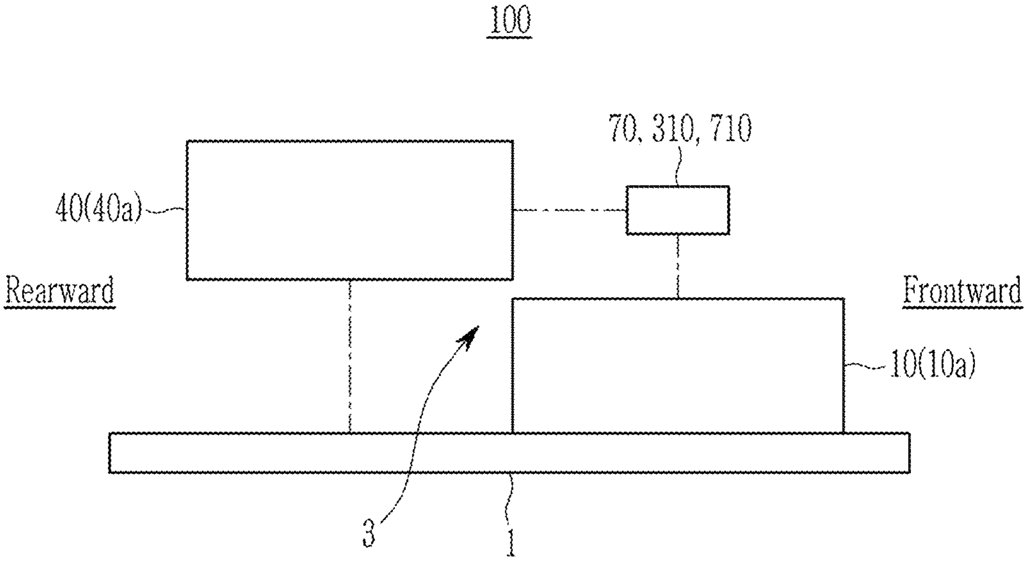
FIG. 1 is a block diagram showing a joint structure of a vehicle body according to an embodiment.

The following reference identifiers may be used in connection with the drawings to describe various features of embodiments of the present invention.

| | |
|---|---|
| 1: under body | 3: upper body |
| 10: front body module | 10a: fixed part |
| 11: fixed part side structure | 21: fixed part roof structure |
| 31: fixed part floor structure | 40: rear body module |
| 40a: variable part | 41: variable part side structure |
| 41a: variable part side member | 51: variable part roof structure |
| 51a: variable part roof member | 61: variable part floor structure |
| 70: joint unit | 81: rear opening portion |
| 91: front opening portion | 100: joint structure |
| 110: fixed part sealing flange | 210: fixed part cover assembly |
| 211: fixed part side cover | 213: fixed part roof cover |
| 214: roof molding member | 215: fixed part floor cover |
| 310: fixed part weather strip | 311, 711: sealing part |
| 313, 713: support lip | 510: variable part sealing flange |
| 511: first fixing flange | 513: second fixing flange |
| 610: variable part cover assembly | 611: variable part side cover |
| 612: side parting strip | 613: variable part roof cover |
| 614: roof parting strip | 615: variable part floor cover |
| 710: variable part weather strip | 910: water tray unit |
| 910a: drain passage | 911: water tray channel |
| 911a: channel wall | 913: water tray lip |
| 915: first lip | 917: second lip |

The drawings referenced above are not necessarily drawn to scale, but should be understood as presenting a somewhat simplified representation of various preferred features illustrating the basic principles of embodiments of the present invention. The specific design features of embodiments of the invention, including, for example, specific dimensions, orientations, locations, and shapes, will be determined in part by the particular intended application and usage environment.

DETAILED DESCRIPTION OF ILLUSTRATIVE EMBODIMENTS

Hereinafter, with reference to the attached drawings, embodiments of the present invention will be described in detail so that those skilled in the art can easily implement the embodiments of the present invention. As those skilled in the art would realize, the described embodiments may be modified in various different ways, all without departing from the spirit or scope of the embodiments of the present invention.

The terminology used herein is for the purpose of describing specific embodiments only and is not intended to limit the embodiments. As used herein, singular forms are intended to also include plural forms, unless the context clearly indicates otherwise.

In addition, in the detailed description below, the names of the components are divided into first, second, etc. to distinguish them when the components are in a similar relationship, and the description below is not necessarily limited to that order.

As used herein, the terms 'comprise' and/or 'comprising' indicate the presence of specified features, integers, steps, operations, elements, and/or components, but they may also include one or more other features, integers, or steps. It should also be understood that this does not exclude the presence or addition of elements, operations, components, and/or groups thereof.

As used herein, the term 'and/or' includes any one or all combinations of one or more items listed in association.

In this specification, the term 'connected' indicates a physical relationship between two components in which the components are directly connected to each other by welding, rivets, self piercing rivet (SPR), flow drill screw (FDS), structural adhesive, etc., or indirectly connected through one or more intermediate components.

As used herein, 'vehicle,' 'vehicular,' 'automotive,' or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based PBVs, hydrogen-powered vehicles, and other alternative fuel vehicles (e.g., other than petroleum fuel derived from resources).

Hereinafter, embodiments of the present invention will be described in detail with reference to the accompanying drawings.

FIG. 1 is a block diagram showing a joint structure of a vehicle body according to an embodiment.

Referring to FIG. 1, a vehicle body to which a joint structure 100 according to an embodiment can be applied may be, for example, a purpose-based mobility vehicle (Purpose Built Vehicle: hereinafter referred to as 'PBV').

The PBV can be utilized as an electric car-based life module vehicle that provides various customized services to users during the time it takes to move from the departure point to the destination.

As an example, the PBV can be manufactured as a 1 box type design with a wide interior space. Furthermore, the PBV may have facing-type seats applied to the interior space.

The vehicle body of this PBV is suitable for small-quantity production of various vehicle types with a small number of parts and can be manufactured in various shapes and sizes.

Furthermore, the vehicle body of the PBV includes a skateboard type under body 1, (which is also commonly referred to as a 'rolling chassis' or 'chassis frame' by those skilled in the art) and an upper body 3 assembled to the under body 1.

The under body 1 can accommodate components such as a battery assembly and a drive motor. And the upper body 3 may be a body in white (BIW) body that is connected to the under body 1 and may include a cabin and luggage room with a wide interior space.

In this specification, the 'front-to-back direction of the vehicle body' may be defined as the longitudinal direction of the vehicle body, the 'vehicle width direction' may be defined as the left-right direction of the vehicle body, and the 'up-and-down direction' may be defined as the height direction of the vehicle body.

Furthermore, in this specification, 'upper end,' 'upper portion,' or 'upper surface' of a component indicates an end, portion, or surface of a component that is relatively upper in the drawing, and 'lower end,' 'lower portion,' or 'lower surface' of a component indicates an end, portion, or surface of a component that is relatively lower in the drawing.

Furthermore, in this specification, an end of a component (e.g., one end or another (other) end, etc.) denotes an end of a component in any one direction, and an end portion of the component (e.g., one end portion) or other (another) end portion, etc.) denotes a portion of a component that includes that end.

The joint structure 100 according to an embodiment is a structure that may apply the upper body 3 of various shapes and purposes to the under body 1 according to the type of customized service of the PBV.

The joint structure 100 according to an embodiment includes the upper body 3 assembled to the under body 1 and including a front body module 10 and a rear body module 40 detachable along the front-to-back direction of the vehicle body.

Figure 2:
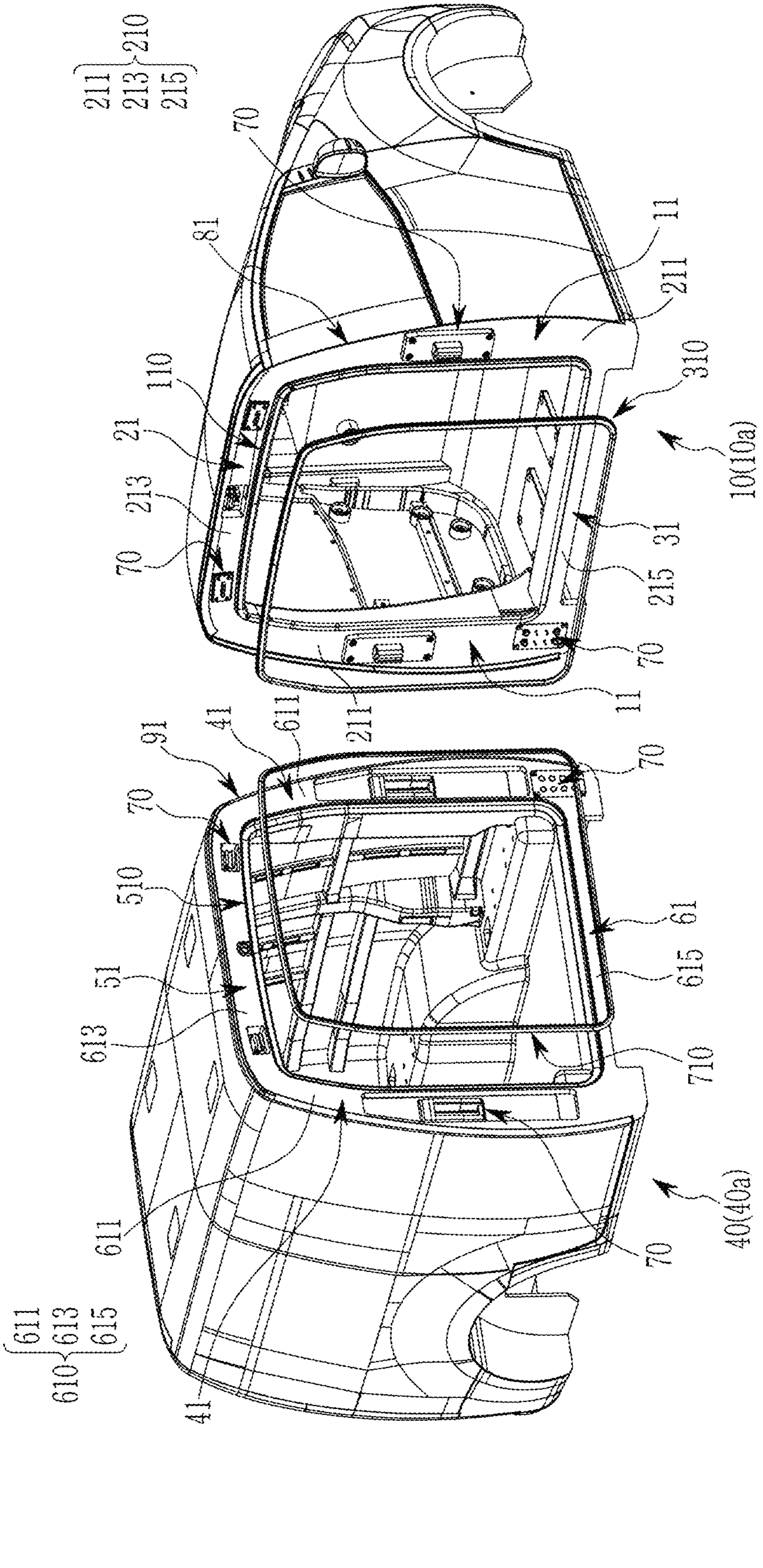
FIG. 2 is a partially exploded perspective view illustrating the joint structure of a vehicle body according to an embodiment.

FIG. 2 is a partially exploded perspective view illustrating the joint structure of a vehicle body according to an embodiment.

Referring to FIG. 1 and FIG. 2, in an embodiment, the front body module 10 includes a front cabin of a cab type. The front body module 10 may be fixed to the front part of the under body 1.

The front body module 10 may be mounted to the front part of the under body 1 along the vertical direction via a vehicle body mounting unit known to a person of ordinary skill in the art. The front body module 10 may be a fixed part (fixed portion) 10*a* fixed to the front part of the under body 1. The fixed part 10*a* is a component connected to the under body 1 and is as a component that is not to be replaced even if the intended use of the vehicle changes.

The front body module 10 includes a fixed part side structure 11, a fixed part roof structure 21, and a fixed part floor structure 31, which are connected to each other.

The fixed part side structure 11 is provided on each side of the front body module 10 in the vehicle width direction. The fixed part roof structure 21 connects the upper part of the fixed part side structures 11 along the vehicle width direction. The fixed part floor structure 31 connects the lower part of the fixed part side structures 11 along the vehicle width direction.

In an embodiment, the rear body module 40 includes a rear cabin or luggage room. The rear body module 40 can be mounted to the rear part of the under body 1.

The rear body module 40 can be connected to the rear part of the under body 1 via a vehicle body mounting unit known to a person of ordinary skill in the art. The rear body module 40 is a component that can be replaced (or detached) depending on the vehicle's intended use and is a variable part (replaceable portion) 40*a*.

The rear body module 40 includes a variable part side structure 41, a variable part roof structure 51, and a variable part floor structure 61.

The variable part side structure 41 is provided on each side of the rear body module 40 in the vehicle width direction. The variable part roof structure 51 connects the upper portion of the variable part side structures 41 along the vehicle width direction. The variable part floor structure 61 connects the lower portion of the variable part side structures 41 along the vehicle width direction.

The joint structure 100 according to an embodiment provides a structure that can be commonly applied to various vehicle types. Various vehicle types means various configurations of the variable part 40*a*, and can be, for example, a hailing vehicle as a means of transporting occupants, a delivery vehicle for transporting goods, and special vehicles such as ambulances.

The joint structure 100 according to an embodiment includes a joint unit 70 configured to connect the front body module 10 and the rear body module 40 along the front-rear direction of the vehicle body.

The joint unit 70 is a configuration for connecting the front body module 10 and the rear body module 40 of the upper body 3 along the front-to-back direction of the vehicle body.

The joint unit 70 may be installed in the fixed part side structure 11, the fixed part roof structure 21, and the fixed part floor structure 31 of the front body module 10. Additionally, the joint unit 70 may be installed in the variable part side structure 41, the variable part roof structure 51, and the variable part floor structure 61 of the rear body module 40.

For example, the joint unit 70 may be configured for various types of coupling, such as a configuration that is manually coupled with a mechanical configuration, a configuration that is coupled by the operation of a separate actuator, and a configuration that can be coupled and/or released depending on the supply of external or internal power, including magnetic, etc. The configuration and operation of the joint unit 70, which connects or disconnects one or more modules or frames, are obvious to those skilled in the art, and thus a detailed description is omitted.

The joint structure 100 according to an embodiment can provide a structure capable of securing sealing performance and drainage performance of the front body module 10 and the rear body module 40 that are coupled to each other along a front-to-back direction of the vehicle body.

The joint structure 100 according to an embodiment includes a fixed part sealing flange 110, a fixed part weather strip 310, a variable part sealing flange 510, and a variable part weather strip 710.

The fixed part sealing flange 110 is formed on an edge of an open-shaped rear opening portion 81 of the rear part of the front body module 10. The rear opening portion 81 may be a border portion forming an opening at the rear of the front body module 10.

The fixed part sealing flange 110 is formed to the fixed part side structure 11, the fixed part roof structure 21, and the fixed part floor structure 31 of the front body module 10.

The fixed part sealing flange 110 may be formed on a fixed part cover assembly 210 provided on the rear opening portion 81.

The fixed part cover assembly 210 includes a fixed part side cover 211 provided on the fixed part side structure 11, a fixed part roof cover 213 provided on the fixed part roof structure 21, and a fixed part floor cover 215 provided on the fixed part floor structure 31.

That is, the fixed part sealing flange 110 may be formed to the fixed part side cover 211, the fixed part roof cover 213, and the fixed part floor cover 215 at the edge of the rear opening portion 81 of the front body module 10.

Figure 3:
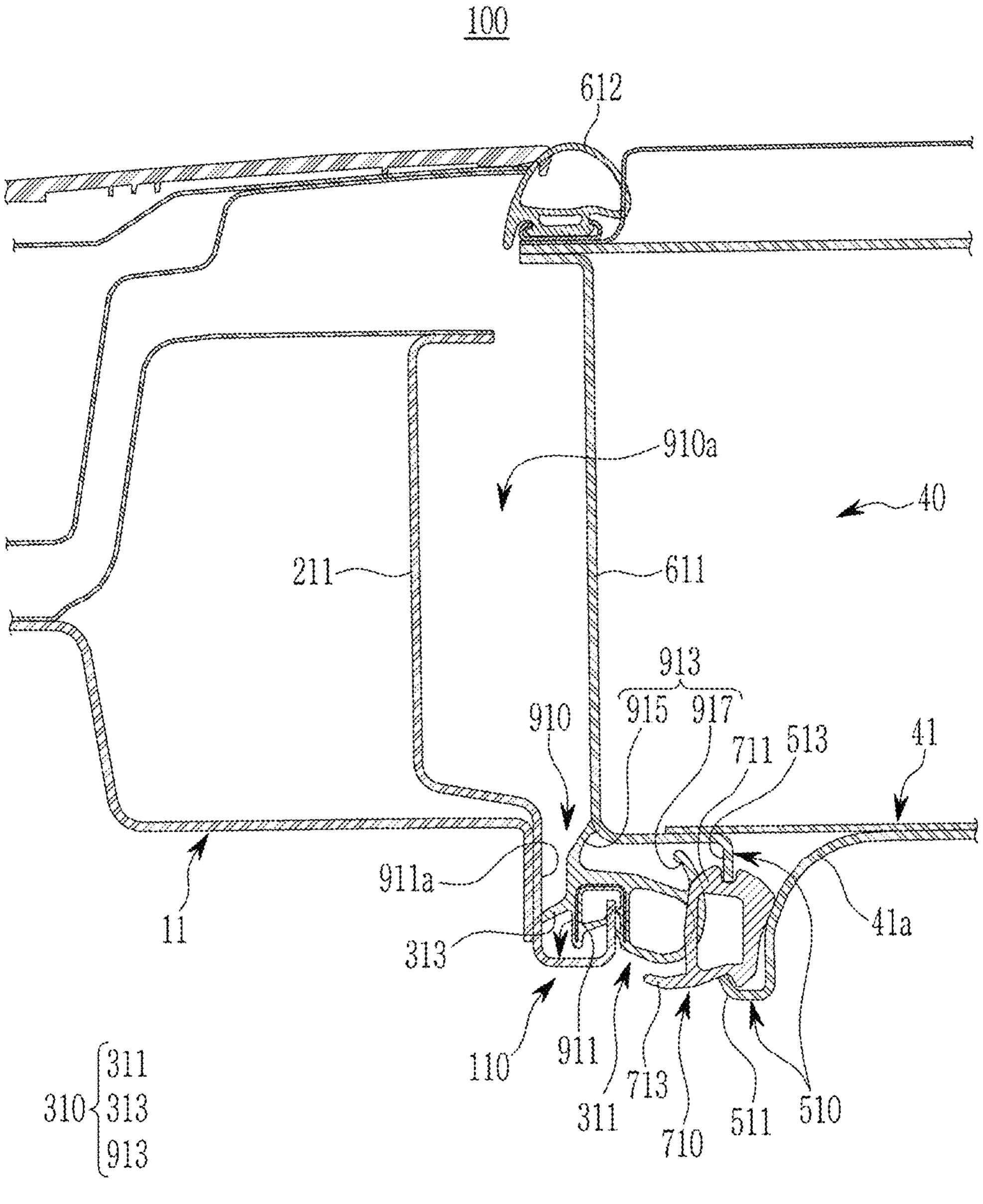
FIG. 3 is a cross-sectional view illustrating a side portion of the joint structure of a vehicle body according to an embodiment.
Figure 4:
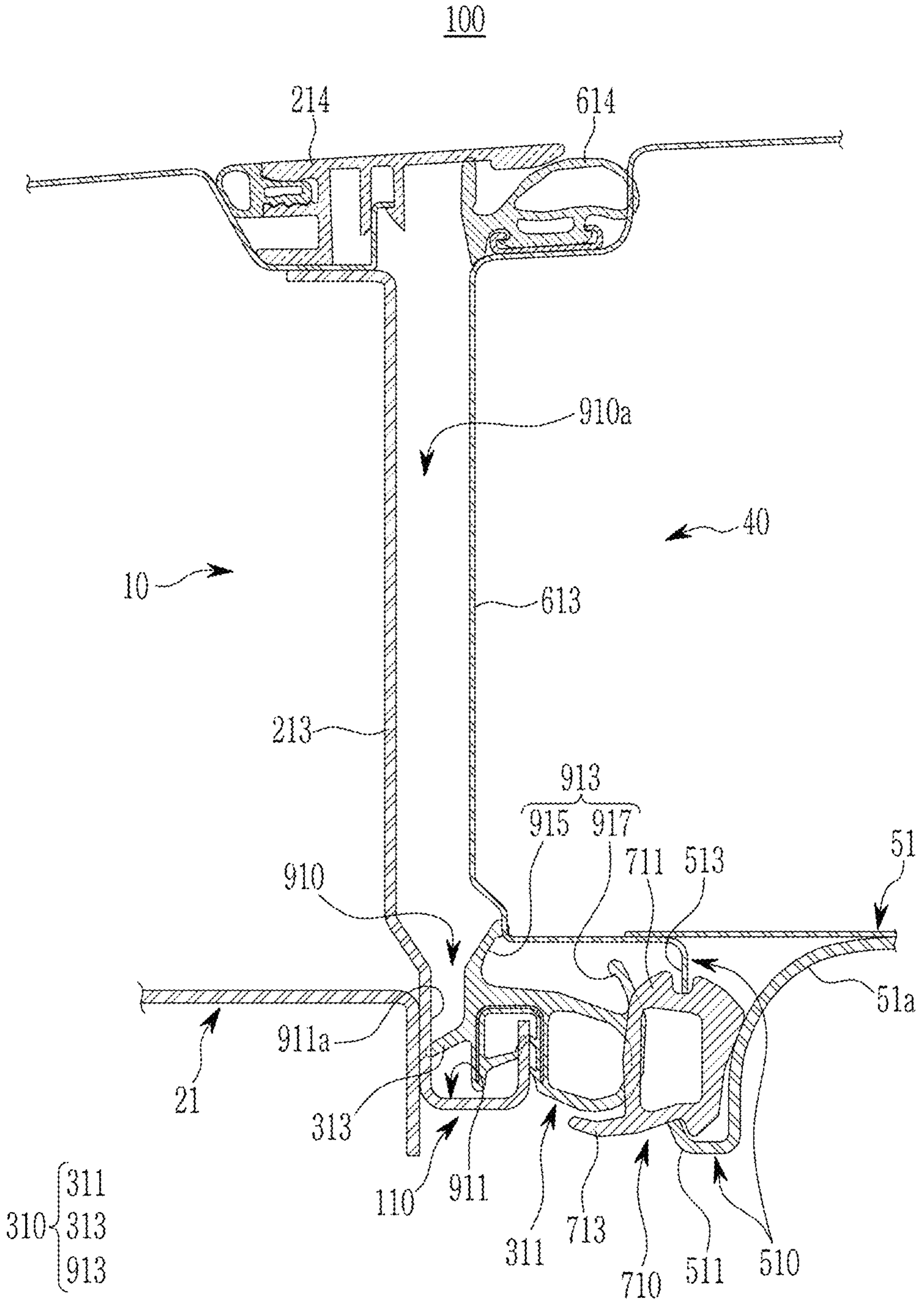
FIG. 4 is a cross-sectional view illustrating a roof portion of the joint structure of a vehicle body according to an embodiment.
Figure 5:
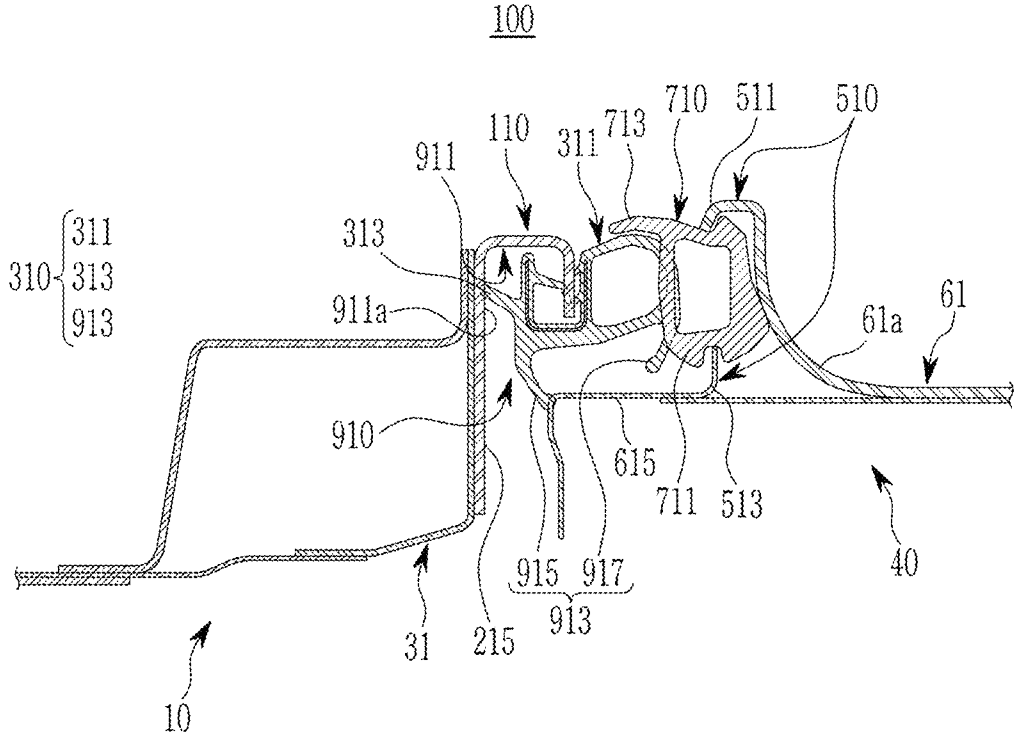
FIG. 5 is a cross-sectional view illustrating the floor portion of the joint structure of a vehicle body according to an embodiment.

FIG. 3 is a cross-sectional view illustrating a side portion of the joint structure of a vehicle body according to an embodiment, FIG. 4 is a cross-sectional view illustrating a roof portion of the joint structure of a vehicle body according to an embodiment, and FIG. 5 is a cross-sectional view illustrating the floor portion of the joint structure of a vehicle body according to an embodiment.

Referring to FIG. 3, the fixed part sealing flange 110 according to an embodiment is formed on the fixed part side cover 211 of the fixed part side structure 11.

Referring to FIG. 4, the fixed part sealing flange 110 is formed on the fixed part roof cover 213 of the fixed part roof structure 21.

Referring to FIG. 5, the fixed part sealing flange 110 is formed on the fixed part floor cover 215 of the fixed part floor structure 31.

The fixed part sealing flange 110 may be formed, for example, in a cross-section shape of a 'U'.

Referring to FIG. 2, in an embodiment, the fixed part weather strip 310 is mounted on the fixed part sealing flange 110 as a sealing member of rubber material.

The fixed part weather strip 310 is available in a 1-piece type and may be formed into a closed shape. The fixed part weather strip 310 is coupled to the fixed part sealing flange 110 so as to completely wrap around the edge of the rear opening portion 81.

Referring to FIG. 3 to FIG. 5, the fixed part weather strip 310 according to an embodiment is mounted on the fixed part sealing flange 110 having a cross-section shape of a 'U'.

The fixed part weather strip 310 includes a sealing part 311 and a support lip 313. The sealing part 311 is connected to the fixed part sealing flange 110. The sealing part 311 may have a hollow space formed inside.

The support lip 313 extends from the sealing part 311 and is designed to support the inner side of the 'U' shape of the fixed part sealing flange 110.

Referring to FIG. 2, the variable part sealing flange 510 is formed on an edge of the open-shaped front opening portion 91 of the front part of the rear body module 40. The front opening portion 91 may be defined as a border portion forming an opening in the front portion of the rear body module 40.

The variable part sealing flange 510 is formed to the variable part side structure 41, the variable part roof structure 51, and the variable part floor structure 61 of the rear body module 40.

The variable part sealing flange 510 is formed on a variable portion cover assembly 610 provided on the front opening portion 91.

The variable part cover assembly 610 includes a variable part side cover 611 provided on the variable part side structure 41, a variable part roof cover 613 provided on the variable part roof structure 51, and a variable part floor cover 615 provided on the variable part floor structure 61.

Referring to FIG. 3, the variable part sealing flange 510 according to an embodiment is formed on a variable part side member 41*a* and the variable part side cover 611 provided on the variable part side structure 41.

Referring to FIG. 4, the variable part sealing flange 510 is formed on a variable part roof member 51*a* and the variable part roof cover 613 provided on the variable part roof structure 51.

Referring to FIG. 5, the variable part sealing flange 510 is formed on a variable part floor member 61*a* and the variable part floor cover 615 provided on the variable part floor structure 61.

The variable part sealing flange 510 includes a first fixing flange 511 and a second fixing flange 513 which are configured to fix the variable part weather strip 710 which will be described later.

Referring to FIG. 3, in the variable part side structure 41, the first fixing flange 511 is formed on the variable part side member 41*a*, and the second fixing flange 513 is formed on the variable part side cover 611.

Referring to FIG. 4, in the variable part roof structure 51, the first fixing flange 511 is formed on the variable part roof member 51*a*, and the second fixing flange 513 is formed on the variable part roof cover 613.

Referring to FIG. 5, in the variable part floor structure 61, the first fixing flange 511 is formed on the variable part floor member 61*a*, and the second fixing flange 513 is formed on the variable part floor cover 615.

Referring to FIG. 2, in an embodiment, the variable part weather strip 710 is mounted to the variable part sealing flange 510 so as to be in close contact with the fixed part weather strip 310, which is mounted to the fixed part sealing flange 110, along the front-to-back direction of the vehicle body.

The variable part weather strip 710 is available in a 1-piece type and may be formed into a closed shape. The variable part weather strip 710 is coupled to the variable part sealing flange 510 to completely wrap around the edge of the front opening portion 91.

Referring to FIG. 3 to FIG. 5, the variable part weather strip 710 according to an embodiment is connected to the first fixing flange 511 and the second fixing flange 513 of the variable part sealing flange 510.

One end of the variable part weather strip 710 may be fixed to the first fixing flange 511, and the other end of the variable part weather strip 710 may be fixed to the second fixing flange 513.

The variable part weather strip 710 may, in one example, include a sealing part 711 having a hollow formed therein and at least one support lip 713 extending from the sealing part 711.

The sealing part 711 is in close contact with the fixed part weather strip 310, and at least one support lip 713 may support the fixed part weather strip 310.

In FIG. 3, drawing reference numeral 612 indicates a side parting strip mounted between the side outer portion of the fixed part side structure 11 and the side outer portion of the variable part side structure 41.

In FIG. 4, drawing reference numerals 214 and 614 represent a roof molding member and a roof parting strip, respectively, mounted between the roof panel of the fixed part roof structure 21 and the roof panel of the variable part roof structure 51.

The joint structure 100 according to an embodiment of the present invention, referring to FIG. 3 to FIG. 5, further comprises a water tray unit 910.

The water tray unit 910 is configured to drain water inflowing between the front body module 10 and the rear body module 40, which are coupled together, to the side and bottom of the vehicle body.

The water tray unit 910 is formed by the fixed part sealing flange 110 and the fixed part weather strip 310.

The water tray unit 910 communicates with a drain passage 910*a* formed between the front body module 10 and the rear body module 40.

Referring to FIG. 3, the drain passage 910*a* may be formed between the fixed part side cover 211 and the variable part side cover 611.

Referring to FIG. 4, the drain passage 910*a* may be formed between the fixed part roof cover 213 and the variable part roof cover 613.

The water tray unit 910 includes a water tray channel 911 formed to the fixed part sealing flange 110 and a water tray lip 913 formed to the fixed part weather strip 310.

The water tray channel 911 may drain water that inflows into the drain passage 910*a* through the side parting strip 612 (see FIG. 3), the roof molding member 214, and the roof parting strip 614 (see FIG. 4) to the side and bottom of the vehicle body.

The water tray channel 911 may be formed in a 'U' shape, which is the cross-section shape of the fixed part sealing flange 110.

The support lip 313 of the fixed part weather strip 310 may support a channel wall 911*a* of the water tray channel 911.

The water tray lip 913 seals between the front body module 10 and the rear body module 40 and directs water inflowing through the drain passage 910*a* to the water tray channel 911.

The water tray lip 913 extends from the sealing part 311 of the fixed part weather strip 310 and may be formed of a 'U' shape.

The water tray lip 913 includes a first lip 915 and a second lip 917.

The first lip 915 extends from one side of the sealing part 311 of the fixed part weather strip 310 and is in close contact with the rear body module 40. That is, the first lip 915 may be in close contact with the variable part side structure 41, the variable part roof structure 51, and the variable part floor structure 61 of the rear body module 40.

The first lip 915 may direct water flowing into the drain passage 910*a* to the water tray channel 911.

The second lip 917 extends from the other side of the sealing part 311 of the fixed part weather strip 310 and is in close contact with the variable part weather strip 710.

The second lip 917 may direct water that overflows from the drain passage 910*a* through the first lip 915 to the variable part weather strip 710 to the side and bottom of the vehicle body.

Figure 6:
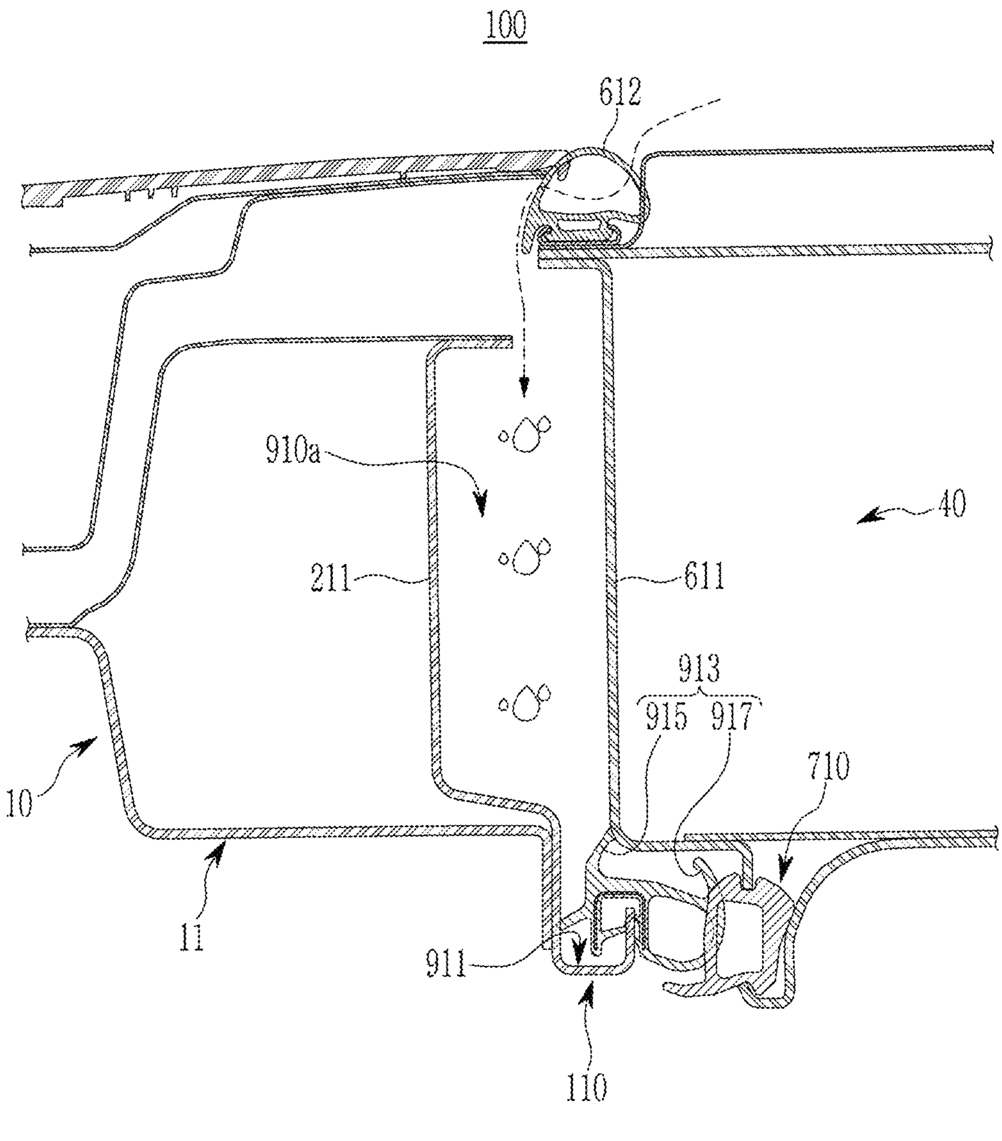
FIG. 6 to FIG. 8 are drawings to explain the operation of the joint structure of a vehicle body according to an embodiment.
Figure 7:
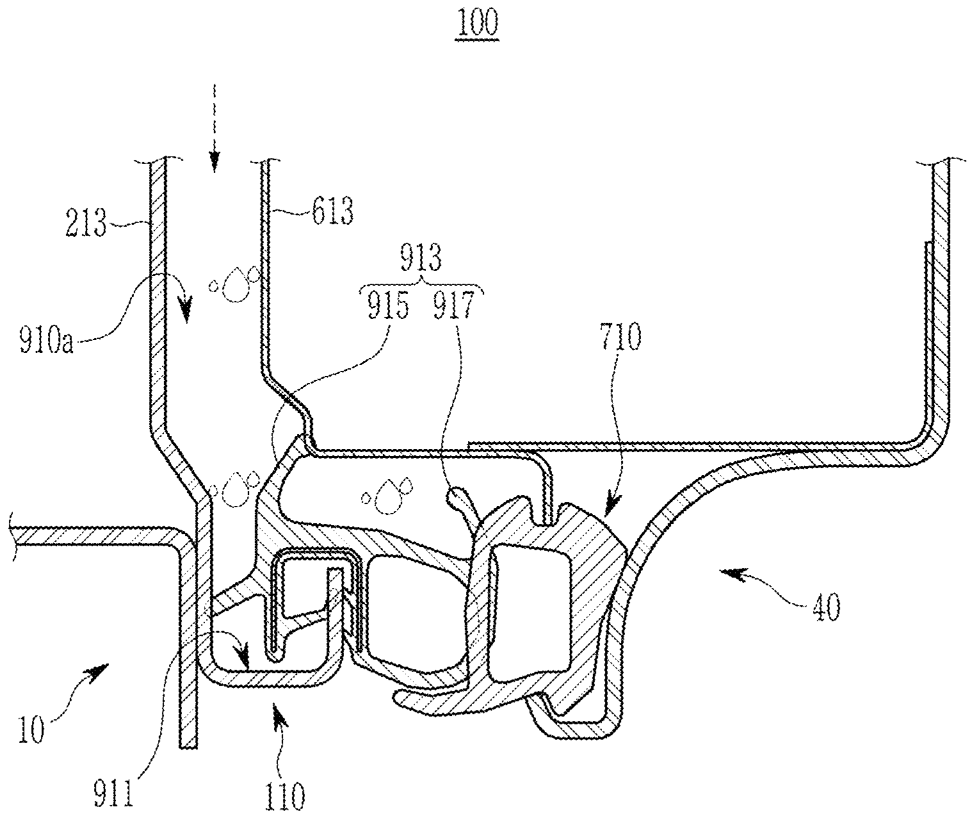
Figure 8:
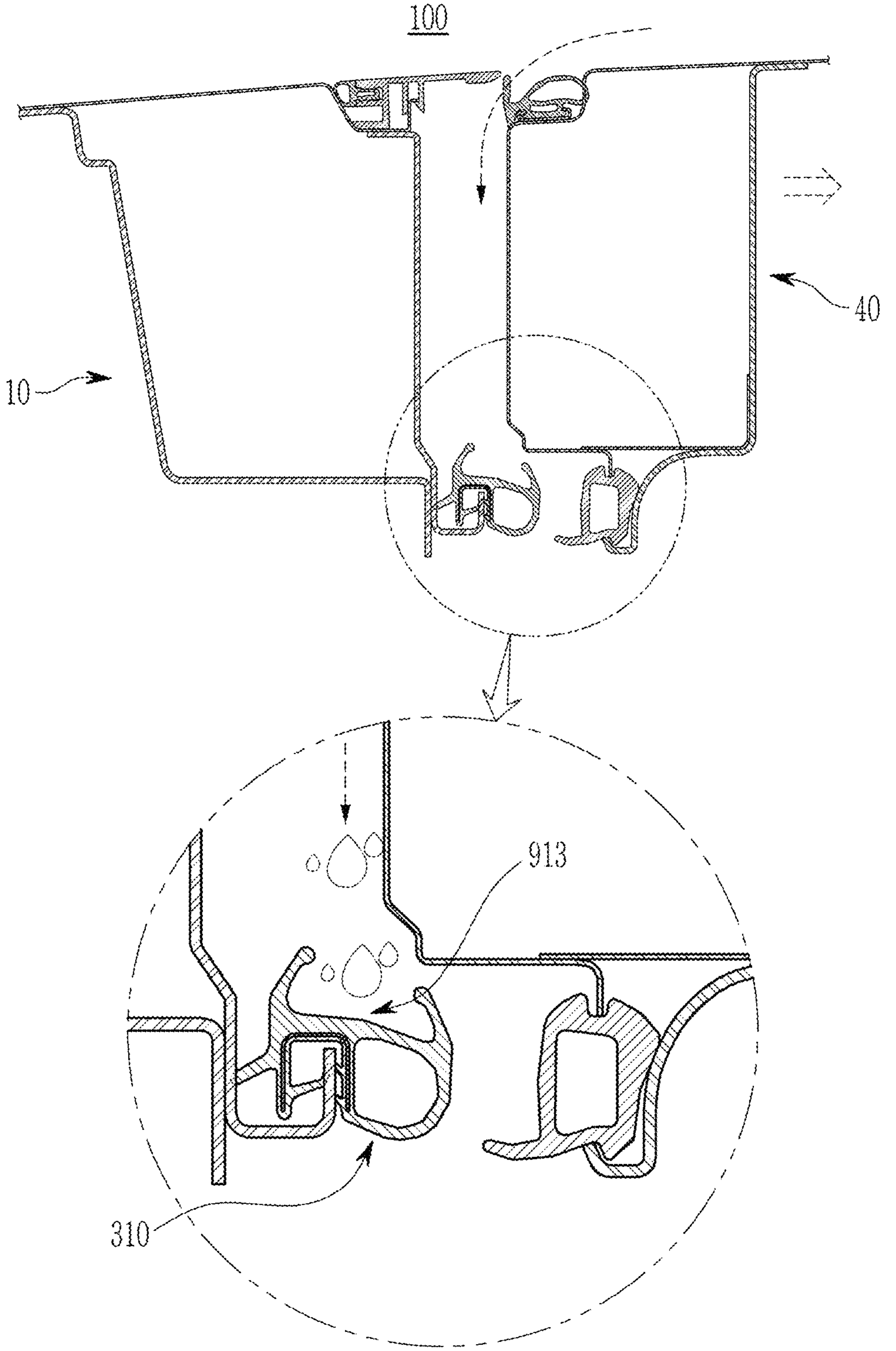

FIG. 6 to FIG. 8 are drawings to explain the operation of the joint structure of a vehicle body according to an embodiment.

Referring to FIG. 1 to FIG. 8, the assembly process and operation of the joint structure 100 according to an embodiment will be described in detail.

Referring to FIG. 1 to FIG. 5, the under body 1 of the vehicle body is provided.

As the upper body 3 to be assembled to the under body 1, the front body module 10 and the rear body module 40 are provided.

The fixed part sealing flange 110 is formed on the edge of the rear opening portion 81 of the front body module 10. The fixed part sealing flange 110 is formed along the edge of the rear opening portion 81 on the fixed part side structure 11, the fixed part roof structure 21, and the fixed part floor structure 31.

The variable part sealing flange 510 is formed on the edge of the front opening portion 91 of the rear body module 40. The variable part sealing flange 510 is formed along the edge of the front opening portion 91 along the variable part side structure 41, the variable part roof structure 51, and the variable part floor structure 61.

The closed shape fixed part weather strip 310 wraps the fixed part sealing flange 110 along the edge of the rear opening portion 81.

The closed shape variable part weather strip 710 wraps the variable part sealing flange 510 along the edge of the front opening portion 91.

In this state, the front body module 10 is connected to the front part of the under body 1 along the vertical direction. The front body module 10 may be equipped as the fixed part 10*a* that is fixed to the front part of the under body 1 by a vehicle body mounting unit.

Next, the rear body module 40, which has various shapes depending on the intended use, is disposed on the rear part of the under body 1.

Then, the front body module 10 and the rear body module 40 are connected along the front-to-back direction of the vehicle body by the joint unit 70.

The joint unit 70 connects the fixed part side structure 11 and the variable part side structure 41 along the front-to-back direction of the vehicle body. The joint unit 70 connects the fixed part roof structure 21 and the variable part roof structure 51 along the front-to-back direction of the vehicle body. Additionally, the joint unit 70 connects the fixed part floor structure 31 and the variable part floor structure 61 along the front-to-back direction of the vehicle body.

Next, the rear body module 40 is connected to the rear part of the under body 1 along the vertical direction. The rear body module 40 is connected in a vertical direction to the rear of the under body 1 by a vehicle body mounting unit. Accordingly, the rear body module 40 may be equipped as the variable part 40*a* connected to the rear part of the front body module 10.

The side parting strip 612 is mounted between the side outer part of the fixed part side structure 11 and the side outer part of the variable part side structure 41. The roof molding member 214 and the roof parting strip 614 are mounted between the roof panel of the fixed part roof structure 21 and the roof panel of the variable part roof structure 51.

As the front body module 10 and the rear body module 40 are joined in the front-to-back direction of the vehicle body, the fixed part weather strip 310 and the variable part weather strip 710 are in close contact with each other along the front-to-back direction of the vehicle body.

Accordingly, the fixed part weather strip 310 and the variable part weather strip 710 seal the edge of the rear opening portion 81 of the front body module 10 and the edge of the front opening portion 91 of the rear body module 40.

The sealing part 311 of the fixed part weather strip 310 is joined to the fixed part sealing flange 110. The variable part weather strip 710 is connected to the first fixing flange 511 and the second fixing flange 513 of the variable part sealing flange 510.

The support lip 313 of the fixed part weather strip 310 supports the channel wall 911*a* of the water tray channel 911. And the first lip 915 of the water tray lip 913 of the fixed part weather strip 310 is in close contact with the rear body module 40, and the second lip 917 is in close contact with the variable part weather strip 710.

In this condition, water may flow into the drain passage 910*a* between the fixed part side cover 211 and the variable part side cover 611 through the side parting strip 612, as shown in FIG. 6.

And, as shown in FIG. 7, water may inflow into the drain passage 910*a* between the fixed part roof cover 213 and the variable part roof cover 613 through the roof molding member 214 and the roof parting strip 614.

In this case, the first lip 915 of the water tray lip 913 guides the water inflowed into the drain passage 910*a* to the water tray channel 911 of the fixed part sealing flange 110, and the water is drained to the side and bottom of the vehicle body through the water tray channel 911.

When water overflows from the drain passage 910*a* to the variable part weather strip 710 through the first lip 915, the second lip 917 of the water tray lip 913 directs the water to the side and bottom of the vehicle body.

Accordingly, water flowing between the front body module 10 and the rear body module 40 may be exhausted to the outside of the vehicle body through the side and bottom of the vehicle body without flowing into the inside of the vehicle body.

Meanwhile, as shown in FIG. 8, when the rear body module 40 is separated from the front body module 10, water may inflow between the front body module 10 and the rear body module 40.

In such cases, the 'U' shaped water tray lip 913 of the fixed part weather strip 310 directs water to the side and bottom of the vehicle body. Therefore, the water tray lip 913 may prevent water from inflowing into the interior of the vehicle body during replacement of the rear body module 40.

According to an embodiment of the joint structure 100 as described so far, the front body module 10 as the fixed part 10*a* coupled to the front part of the under body 1 can be left as is, and the rear body module 40 as the variable part 40*a* can be coupled to the rear part of the under body 1 and the front body module 10.

Therefore, the joint structure 100 according to an embodiment can replace the rear body module 40 of a predetermined shape according to the type of customized service (e.g., use case) of the PBV.

Accordingly, the joint structure 100 of a vehicle body according to an embodiment can easily change the structure of the upper body 3 of the vehicle body depending on the purpose of use of the PBV, and the manufacturing cost of the PBV can be reduced.

The joint structure 100 according to an embodiment includes the fixed part weather strip 310 of the closed shape connected to the fixed part sealing flange 110 and the variable part weather strip 710 of the closed shape connected to the variable part sealing flange 510.

Therefore, the joint structure 100 according to an embodiment can secure sealing performance and sealing robustness of the front body module 10 and the rear body module 40 connected to each other.

The joint structure 100 according to an embodiment includes the water tray unit 910, the 'U' shaped water tray channel 911 formed in the fixed part sealing flange 110, and the 'U' shaped water tray lip 913 formed in the fixed part weather strip 310.

Accordingly, the joint structure 100 according to an embodiment can drain water inflowing between the front body module 10 and the rear body module 40 to the side and lower portion of the vehicle body through the water tray unit 910.

Accordingly, the joint structure 100 according to an embodiment can secure watertight performance of the front body module 10 and the rear body module 40 that are connected to each other and can secure drainage performance of water inflowing between the front body module 10 and the rear body module 40.

Although the preferred embodiments of the present invention have been described above, the embodiments of the present invention are not limited thereto, and various modifications may be made within the scope of the claims, the detailed description of the preferred embodiments of the invention, and the attached drawings, which also fall within the scope of the embodiments of the present invention.

What is claimed is:

1. A joint structure of a vehicle body, the joint structure comprising:

a fixed part sealing flange disposed on an edge of a rear opening portion of a front body module of the vehicle body, wherein the front body module is a fixed part fixed to an under body of the vehicle body;

a fixed part weather strip mounted on the fixed part sealing flange;

a variable part sealing flange disposed on an edge of a front opening portion of a rear body module, wherein the rear body module is a variable part detachably coupled to the front body module along a front-to-back direction of the vehicle body by a joint; and a variable part weather strip mounted on the variable part sealing flange in close contact with the fixed part weather strip.

2. The joint structure of claim 1, further comprising a water tray defined by the fixed part sealing flange and the fixed part weather strip.

3. The joint structure of claim 2, wherein the water tray communicates with a drain passage disposed between the front body module and the rear body module.

4. The joint structure of claim 2, wherein the water tray comprises:

a water tray channel having a 'U' shape and disposed in the fixed part sealing flange; and a water tray lip having the 'U' shape and disposed in the fixed part weather strip.

5. The joint structure of claim 4, wherein the fixed part weather strip comprises:

a sealing part connected to the fixed part sealing flange; and a support lip extending from the sealing part to support a channel wall of the water tray channel.

6. The joint structure of claim 5, wherein the water tray lip comprises:

a first lip extending from a first side of the sealing part and in close contact with the rear body module; and a second lip extending from a second side of the sealing part and in close contact with the variable part weather strip.

7. The joint structure of claim 1, wherein the variable part sealing flange comprises:

a first fixing flange fixing a first side of the variable part weather strip; and a second fixing flange fixing a second side of the variable part weather strip.

8. A joint structure of a vehicle body, the joint structure comprising:

a fixed part sealing flange disposed on an edge of a rear opening portion of a front body module of the vehicle body, wherein the front body module is a fixed part fixed to an under body of the vehicle body, and wherein the fixed part sealing flange is disposed on a fixed part side cover of a fixed part side structure, a fixed part roof cover of a fixed part roof structure, and a fixed part floor cover of a fixed part floor structure at the edge of the rear opening portion of the front body module;

a fixed part weather strip mounted on the fixed part sealing flange;

a variable part sealing flange disposed on an edge of a front opening portion of a rear body module, wherein the rear body module is a variable part detachably coupled to the front body module along a front-to-back direction of the vehicle body by a joint; and a variable part weather strip mounted on the variable part sealing flange in close contact with the fixed part weather strip.

9. The joint structure of claim 8, wherein the fixed part sealing flange has a cross-sectional shape of a 'U'.

10. The joint structure of claim 8, wherein the variable part sealing flange is disposed on a variable part side member and a variable part side cover of a variable part side structure, a variable part roof member and a variable part roof cover of a variable part roof structure, and a variable part floor member and a variable part floor cover of a variable part floor structure at the edge of the front opening portion of the rear body module.

11. The joint structure of claim 10, wherein a drain passage is disposed between the fixed part roof cover and the variable part roof cover and between the fixed part side cover and the variable part side cover.

12. The joint structure of claim 8, further comprising a water tray defined by the fixed part sealing flange and the fixed part weather strip.

13. The joint structure of claim 12, wherein the water tray communicates with a drain passage disposed between the front body module and the rear body module.

14. The joint structure of claim 12, wherein the water tray comprises:

a water tray channel having a 'U' shape and disposed in the fixed part sealing flange; and a water tray lip having the 'U' shape and disposed in the fixed part weather strip.

15. The joint structure of claim 14, wherein the fixed part weather strip comprises:

a sealing part connected to the fixed part sealing flange; and a support lip extending from the sealing part to support a channel wall of the water tray channel.

16. The joint structure of claim 15, wherein the water tray lip comprises:

a first lip extending from a first side of the sealing part and in close contact with the rear body module; and a second lip extending from a second side of the sealing part and in close contact with the variable part weather strip.

17. The joint structure of claim 8, wherein the variable part sealing flange comprises:

a first fixing flange fixing a first side of the variable part weather strip; and a second fixing flange fixing a second side of the variable part weather strip.

18. A vehicle comprising:

a vehicle body comprising an under body and an upper body, the upper body comprising:

a front body module fixed to the under body; and a rear body module detachably coupled to the under body and detachably coupled to the front body module along a front-to-back direction of the vehicle body;

a fixed part sealing flange disposed on an edge of a rear opening portion of the front body module of the vehicle body;

a fixed part weather strip mounted on the fixed part sealing flange;

a variable part sealing flange disposed on an edge of a front opening portion of the rear body module; and a variable part weather strip mounted on the variable part sealing flange in close contact with the fixed part weather strip.

19. The vehicle of claim 18, further comprising a water tray defined by the fixed part sealing flange and the fixed part weather strip, wherein the water tray communicates with a drain passage disposed between the front body module and the rear body module.

20. The vehicle of claim 19, wherein:

the water tray comprises:

a water tray channel having a 'U' shape and disposed in the fixed part sealing flange; and a water tray lip having the 'U' shape and disposed in the fixed part weather strip;

the fixed part weather strip comprises:

a sealing part connected to the fixed part sealing flange; and a support lip extending from the sealing part to support a channel wall of the water tray channel; and the water tray lip comprises:

a first lip extending from a first side of the sealing part and in close contact with the rear body module; and a second lip extending from a second side of the sealing part and in close contact with the variable part weather strip.

* * * * *